PATENTED FEB 13 1973 3,716,474
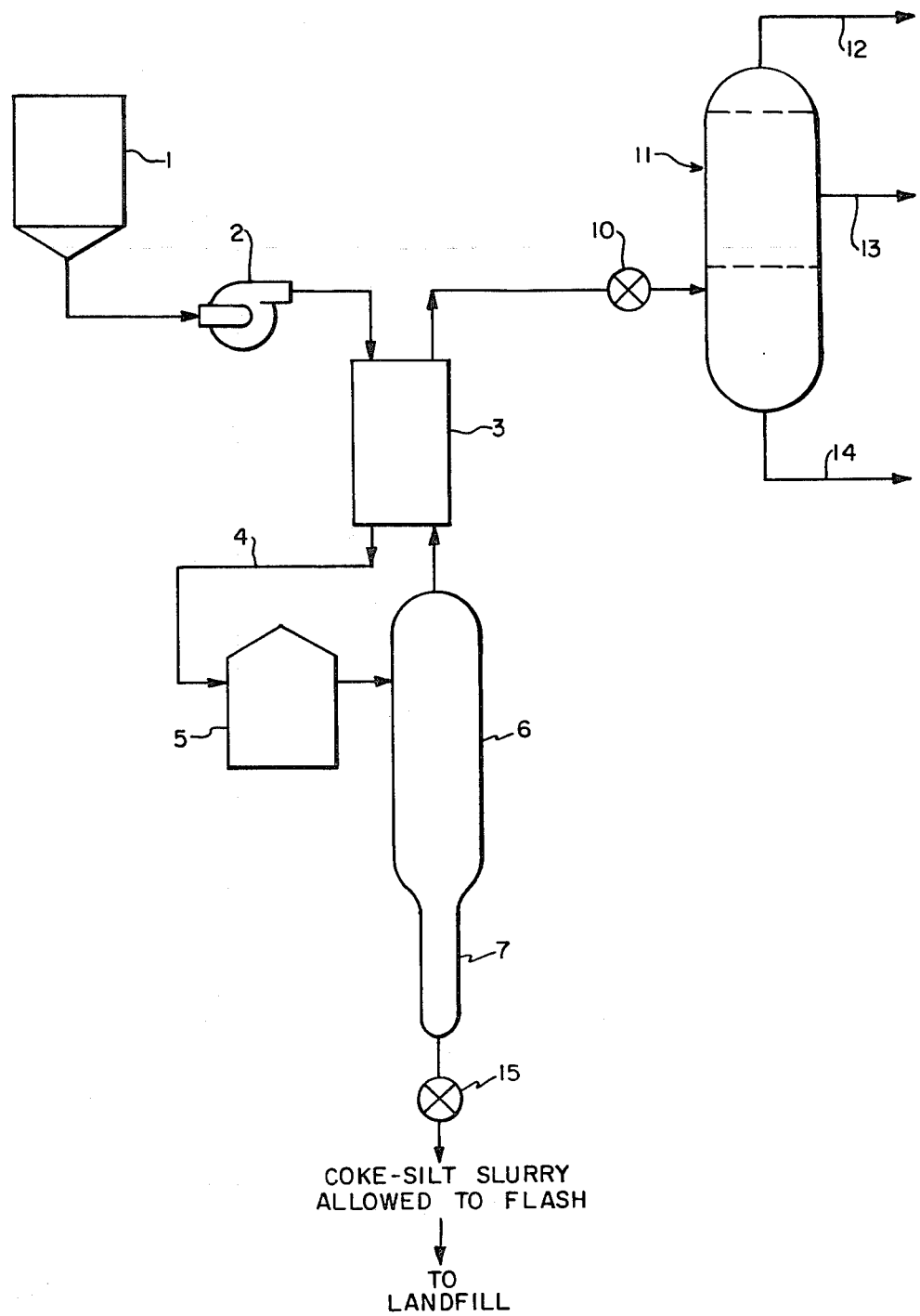

United States Patent [19]
Hess et al.

[11] 3,716,474
[45] Feb. 13, 1973

[54] HIGH PRESSURE THERMAL TREATMENT OF WASTE OIL-CONTAINING SLUDGES

[75] Inventors: Howard V. Hess, Glenham; Edward L. Cole, Fishkill, both of N.Y.

[73] Assignee: Texaco Inc., New York, N.Y.

[22] Filed: Oct. 22, 1970

[21] Appl. No.: 83,057

[52] U.S. Cl. .................. 208/13, 210/71, 252/346
[51] Int. Cl. ........................ B01d 17/04, C02b 1/02
[58] Field of Search ...... 208/13; 210/65, 71, 73, 180, 210/63; 252/328, 346–348

[56] References Cited

UNITED STATES PATENTS

| | | | |
|---|---|---|---|
| 3,606,731 | 9/1971 | Cole et al. | 210/71 X |
| 2,043,646 | 6/1932 | Bahlke | 208/13 X |
| 2,092,200 | 9/1937 | Bahlke | 208/13 |
| 2,789,083 | 4/1957 | Hardy | 252/328 X |

Primary Examiner—Samih N. Zaharna
Assistant Examiner—Thomas G. Wyse
Attorney—Thomas H. Whaley and Carl G. Reis

[57] ABSTRACT

Oil-water emulsion-type sludges, in particular refinery pit sludges are thermally treated at a temperature of at least 750° F under pressure of at least 3,000 psi to give a gas phase containing saturated hydrocarbons, suitable as fuel or cracking stock, a usable oil fraction, a water phase and a useful silt-coke phase.

7 Claims, 1 Drawing Figure

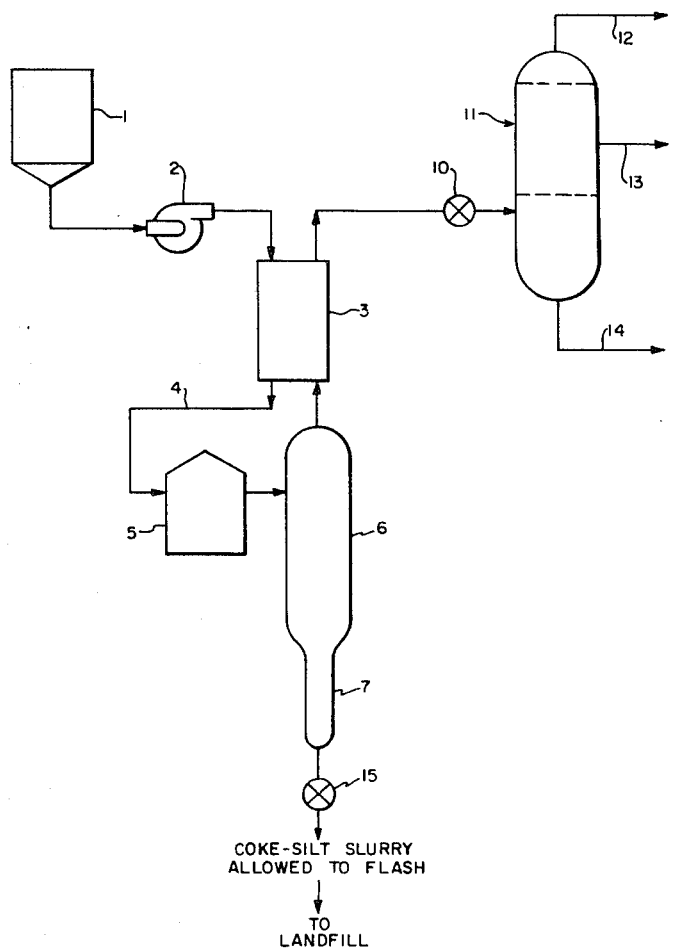

COKE-SILT SLURRY
ALLOWED TO FLASH

TO
LANDFILL

HIGH PRESSURE THERMAL TREATMENT OF WASTE OIL-CONTAINING SLUDGES

BACKGROUND OF THE INVENTION

The present invention relates to a process for treating waste oil-containing sludges. More particularly, this invention relates to a process for heat treating refinery pit sludges to obtain readily disposable end products.

Sludges of the type with which the invention is concerned consist of essentially an oil-in-water emulsion containing suspended silt and various other organic and inorganic materials as well as a biological component. Refineries generally dispose of sludge by flowing it to very large pits dug into the ground. Typically the sludge may stay in a pit for 20 to 30 years before anything is done to it to reclaim the involved land area and recover the oil from the pit. With passage of time more and more difficulty is encountered disposing of the sludge.

More specifically, a typical disposal pit may have an area of 30 acres, can be 10 ft. deep and can contain 97.8 to $10^6$ gallons of sludge containing, by weight, 36% oil, 40% water and 9% ash and 15% free carbon.

Analyses have shown the disposal pit sludge to be a very stable emulsion of oil and water, further complexed with suspended free carbon and silt and probably some biological sludge. The system cannot be resolved by either centrifuging or filtering. In the past, attempts to resolve the system into oil and water and silt at temperatures of 400°–600° F under autogenous pressure have not been very successful, as the resulting product is not readily separable into the desired oil, water and silt components.

It was believed that processing under pressure above the critical temperature of water and under autogenous pressure might permit separation of the system and, indeed, work at 725° F shows some separation in the system but any mixing causes the system to emulsify again with the attendant separation problems.

In considering the system, and particularly in the light of the work at 725° F, it is apparent that emulsifying agents are still present. These emulsifying agents are suspected to be materials such as the metallic salts of aromatic sulfonic acids which are well known for their ability to form emulsions between water and oil. Some of the materials which accumulate in the waste disposal pit are from the sulfuric acid treating of lubricating oils and the like and contain high molecular weight aromatic sulfonic acids which emulsify the oil-water system.

The invention resides in a process which includes the steps of heat treating sludge to a temperature of between about 750° and 850° F under a pressure of between about 3,000 psi and 6,500 psi, thereby forming a gas phase, an oil fraction, an aqueous phase and a silt-coke phase; separating the silt-coke phase from the other products; separating the aqueous phase from the gas phase and the oil phase, and recovering the oil and the gas.

In the process of the invention, coke deposits on the silt particles which are suspended in the feed as it passes through the heater and thence into an insulated hold vessel. A large amount of sulfur is given off (as $H_2S$ in the produced gas) indicative of the destruction of sulfur-containing emulsion formers in the sludge. Further, a large amount of $CO_2$ is given off in the gas indicative of decarboxylation reactions which can be related to destruction of the biological component. After sufficient time has elapsed to carry out the thermal treatment, and the system is finally cooled, it separates into a gas phase, oil phase, water phase, and silt and coke phase which has settled to the bottom of the water phase.

In the physical embodiment of the invention diagrammed in the drawing, sludge is pumped from the sludge source (1) by high pressure pump (2) up to system pressure and through heat exchanger (3) where it is in heat exchange with material coming from the top of hold vessel (6). After heat exchange the sludge passes through line (4) to fired heater (5) where the temperature is raised to reaction temperature. The material from the heater goes into vessel (6) which is a high pressure insulated vessel wherein time is provided for the thermal reactions to occur, generally from about 10 minutes to 120 minutes. At the bottom of vessel (6) a non-insulated boot is provided (7). In the non-insulated boot (7) the temperature of the water drops below the critical temperature of water and a liquid-water phase is maintained. The walls of the boot are wet with water and the silt-coke phase settles through the condensed water to the bottom of the boot to be drawn through valve 15. A liquid water level is maintained at point (8) and a liquid level controller is located there which actuates valve (15) intermittently to blow down a coke-silt slurry in water, say at 400° F, through line (9). This coke-silt slurry from line (9) may be allowed to flash to remove water and then sent to landfill.

The material in the insulated hold vessel (6) which has water above the critical temperature, oil which is substantially vaporized in the supercritical water and gas, is passed, after a suitable holding time, through heat exchanger (3) in heat exchange with the sludge feed, through pressure reducing valve (10) and thence into a separator vessel (11) where it separates into a gas phase, an oil phase, and a water phase. These three components may be withdrawn through lines (12), (13) and (14) for further processing. The effluent water from line 14 has a pH of around 4.5 and can be biologically oxidized or discharged as such, if permissible.

A number of different flow arrangements can be provided. For example, it might be desirable to reduce pressure between vessel (6) and heat exchanger (3) so that the shell side of the exchanger could be at low pressure. A different arrangement from the booted vessel can be provided.

In a specific example of sludge treatment according to the embodiment shown in the figure carried out at 750° F and 4,000 psig the oil yield was 36.7% (wt.), the wet coke yield was 27.5% and the gas yield was 3.5%. The oil recovered had about 23° API gravity whilst the coke on a dry basis consisted of about 40 percent carbon with a heating value of 7500 BTU/lb. The gas recovered contained mostly $C_1$–$C_4$ hydrocarbons and had a heating value of approximately 1500 BTU/cu. ft. after scrubbing for removal of $CO_2$ and $H_2S$.

More specific data are given in the following Tables of runs made with the aforedescribed process operated on a sample of Waste Disposal Pit Sludge. This particular sample of sludge had the following approximate analysis:

| | |
|---|---|
| Wt. % H$_2$O | 40.3 |
| Wt. % Ash | 8.6 |
| Wt. % Oil & free carbon | 51.1 |
| Wt. % Oil | 36.4 |
| Wt. % free carbon (by diff.) | 14.7 |

| | Case I | Case II | Case III | Case IV |
|---|---|---|---|---|
| Temperature, °F | 750 | 750 | 800 | 850 |
| Time, hrs. (at Temp.) | 2 | 3 | 2 | 2 |
| Pressure, psig. | 3975 | 3900 | 4400 | 6150 |
| Oil Yield, Wt.% | 36.7 | 36.0 | 27.1 | 14.3 |
| Water Yield, Wt.% | 32.3 | 34.0 | 33.4 | 32.6 |
| Wet Coke Yield, Wt.% | 27.5 | 25.0 | 32.5 | 47.3 |
| Gas Yield, Wt.% | 3.5 | 5.0 | 7.0 | 5.8 |
| | 100.0 | 100.0 | 100.0 | 100.0 |
| % Water in Wet Coke | 22% | 17% | 34% | 33% |

| Yields Per Barrel (42 gal) | Case I | Case II | Case III | Feed Case IV |
|---|---|---|---|---|
| Temperature °F | 750 | 750 | 800 | 850 |
| Time, hrs. (at Temp.) | 2 | 3 | 2 | 2 |
| Pressure, psig. | 3975 | 3900 | 4400 | 6150 |
| Oil Yield (vol.%) | 43.6 | 40.7 | 33.4 | 17.5 |
| Gallons | 18.4 | 17.1 | 14.1 | 7.3 |
| Water Yield (vol.%) | 35.0 | 36.8 | 36.1 | 35.2 |
| Gallons | 14.7 | 15.3 | 15.2 | 14.8 |
| Wet Coke (Wt.%) | 27.5 | 25.0 | 32.5 | 47.3 |
| Pounds | 105 | 93 | 120 | 176 |
| Gas Yield (Wt.%) | 3.5 | 5.0 | 7.0 | 5.8 |
| Pounds | 12.9 | 18.4 | 26.1 | 21.6 |
| Cu. Ft. | 140 | 172 | 225 | 250 |

It can be concluded from the above that optimum oil recovery occurs at 750° F. The oil produced is essentially a distillate oil with typical properties as shown below:

| | | | Distillation | |
|---|---|---|---|---|
| %C | 86.6 | | % | |
| %H | 11.5 | | 0 | — |
| %S | 0.37 | | 5 | 300 |
| %N | 0.1 | | 10 | 364 |
| %H$_2$O | 0 | | 20 | 468 |
| Density | 0.9121 | | 30 | 533 |
| | | | 40 | 584 |
| | | | 50 | 620 |
| | | | 60 | 652 |
| | | | 70 | 695 |
| | | | 80 | 717 |
| | | | 90 | 729 |
| | | | 100 | cracked |

The gas produced is essentially a saturated hydrocarbon gas (the hydrogen apparently being soaked up in saturating the olefinic gases conventially produced in thermal operations) with large amounts of $CO_2$ (apparently from decomposition of oxygenates in the sludge) and considerable $H_2S$. Gas analyses from Cases I and II are shown below:

| | Case I | Case II |
|---|---|---|
| Cu. ft./Bbl | 140 | 172 |
| Mol % | | |
| H$_2$ | 5.1 | 1.0 |
| CH$_4$ | 18.9 | 14.6 |
| C$_3$H$_8$ | 6.8 | 11.5 |
| C$_2$H$_6$ | 8.3 | 12.0 |
| Iso C$_4$ | 1.5 | 2.6 |
| CO$_2$ | 43.0 | 43.5 |
| C$_5$ | 2.0 | 3.4 |
| nC$_4$ | 2.3 | 4.3 |
| C$_6$ | 0.9 | 1.7 |
| H$_2$S | 10.0 | 5.4 |

Advantageously in the process of the invention the coke-silt phase does not adhere to the walls of the high pressure vessel and can be blown down as a water slurry. The present process is not to be confused with delayed petroleum coking where coke builds up on the walls of the delayed coker or hold drum eventually filling the coke drum and necessitating shut down and opening of the vessel for removing the coke. In the process of this invention, as little coke production as possible is sought, consistent with resolving the starting emulsion so that the maximum amount of oil may be recovered. Further, petroleum coking is generally carried out at 900°–950° F and low pressure. Here, lower temperatures are used and the high pressure is due to supercritical water. In petroleum coking, an olefinic naphtha and an olefinic gas are produced. In this process, the oil is not cracked to any appreciable extent. Very little naphtha is produced and a saturated gas is produced. Also, in petroleum coking, no carbon dioxide is found in the gaseous product.

While this invention has been illustrated with specific physical embodiments, these are exemplary only, and the scope of the invention is limited only by the subjoined claims.

We claim:

1. In a sludge treatment process, the steps of:
   heat treating an oil-containing emulsified sludge in a coking zone at a temperature of between about 750° F and 850° F under a pressure of 3000 to 6,500 psi to form a gas phase, an oil fraction, an aqueous phase and a silt-coke phase;
   allowing said products to cool;
   separating said silt-coke phase from said other products;
   separating said aqueous phase from said gas phase and said oil phase and recovering said oil and said gas from their respective phases.

2. The process as defined in claim 1, wherein said silt-coke phase is removed from said coking zone by being blown down as a water slurry and said slurry is flash evaporated.

3. The process as defined in claim 1, wherein said sludge is preheated by heat exchange with products from said heat treating.

4. The process as defined in claim 1, wherein said gas phase, said oil phase and said aqueous phase are depressured prior to separation from one another.

5. The process as defined in claim 1, wherein said coking zone includes an insulated portion in which said sludge is retained and a non-insulated portion depending from said insulated portion and adapted to receive said silt-coke phase as it forms.

6. The process as defined in claim 1, wherein said heat treating is continued for about 10 minutes to about 120 minutes.

7. The process as defined in claim 1 carried out at around 750° F to maximize oil recovery.

* * * * *